Aug. 15, 1950  J. C. RENAULT  2,518,570
WATER CONTROL DEVICE FOR PLANTING MACHINES
Filed Sept. 25, 1945  2 Sheets-Sheet 1

INVENTOR
J. C. Renault
BY
ATTORNEYS

Aug. 15, 1950            J. C. RENAULT            2,518,570
WATER CONTROL DEVICE FOR PLANTING MACHINES
Filed Sept. 25, 1945            2 Sheets-Sheet 2
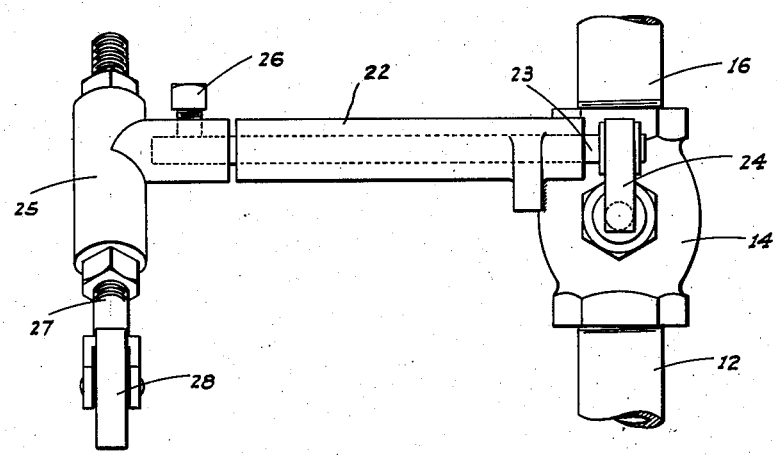
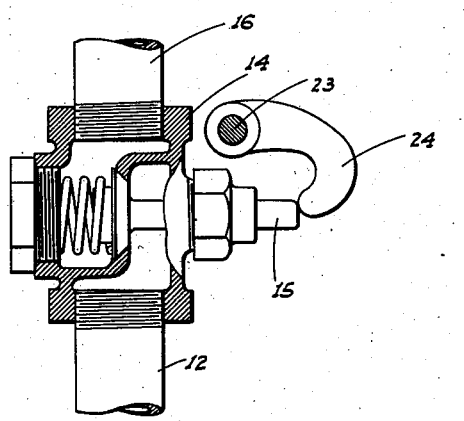
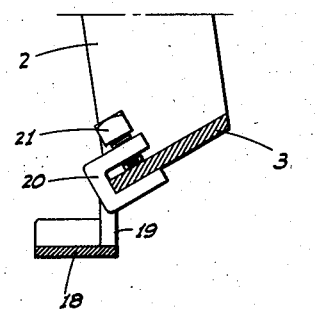
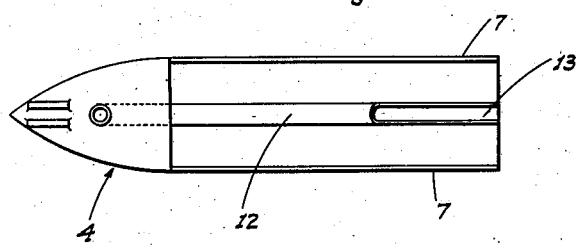
INVENTOR
J. C. Renault
BY
ATTORNEYS Patented Aug. 15, 1950

2,518,570

UNITED STATES PATENT OFFICE 2,518,570

WATER CONTROL DEVICE FOR PLANTING MACHINES

Jean C. Renault, Salinas, Calif., assignor to Farmers Mercantile Company, Salinas, Calif., a corporation of California Application September 25, 1945, Serial No. 618,524

4 Claims. (Cl. 111—7)

This invention relates in general to improvements in planting machines adapted to plant row crops, such as tomatoes, with the plants spaced equi-distant in the rows.

One feature of the present invention is to provide, in a planting machine, as above, a novel water control device arranged to function upon advance of the machine to automatically supply a predetermined amount of water into the furrow and about the roots of each plant as it is deposited in said furrow by the machine.

Another feature of the invention is to provide a water control device which includes a water discharge conduit extending into the hollow, furrow forming shoe of the planting machine; the machine depositing the plants in the furrow directly to the rear of the shoe, and said conduit discharging water rearwardly into the furrow in such timed relation to the deposit of plants therein as to wash or flush the roots of such plants into place in the furrow before closing of the latter; the water then serving as the initial moisture to enhance the growth of the plants.

A further object of the invention is to produce a simple and inexpensive device, and yet one which will be exceedingly effective for the purpose for which it is designed.

These objects are accomplished by means of such strucure and relative arrangement of parts as will fully appear by a perusal of the following specification and claims.

In the drawings similar characters of reference indicate corresponding parts in the several views:

Figure 2 is an enlarged fragmentary elevation of the water valve and the actuating mechanism therefore.

Figure 3 is an elevation of the valve, mainly in section, showing the position of the valve actuating lever in relation to the valve stem.

Figure 4 is a fragmentary cross section on line 4—4 of Fig. 1.

Figure 5 is a plan view of the furrow opening shoe, detached.

Figure 1:
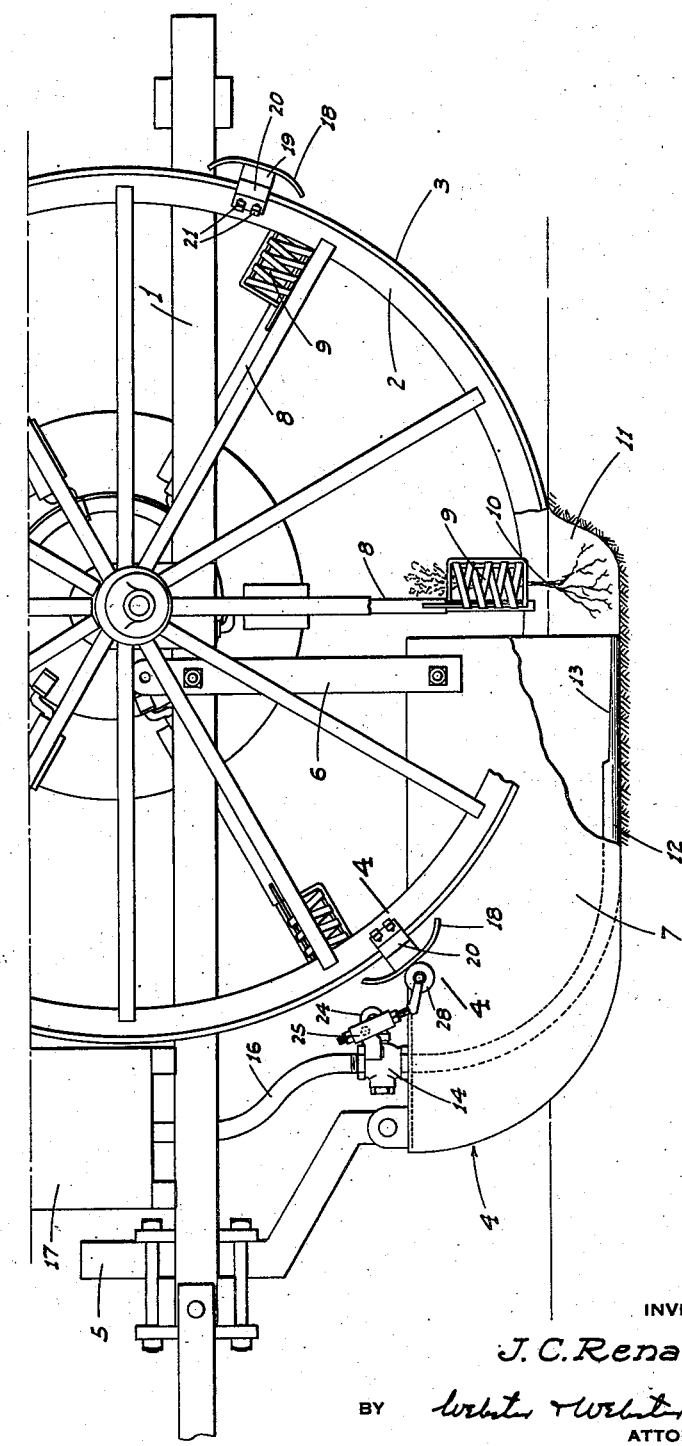
Figure 1 is a side elevation of a planting machine embodying the present invention.

Referring now more particularly to the characters of reference on the drawings, the invention is here shown as embodied in connection with a planting machine of the type shown in U. S. Patent No. 2,372,739, dated April 3, 1945, which machine incudes a main frame 1 supported above and for movement along the ground by a pair of transversely spaced, relatively large-diameter ground engaging wheels 2 which are canted laterally into downwardly converging relation; these wheels including flat rims 3 of substantial width. The rims 3 are spaced apart a distance slightly greater than the width at its rear end of a hollow furrow opening shoe 4 which is adjustably supported from the frame by means of standards 5 and 6; said furrow opening shoe including downwardly converging sides 7, and the shoe being disposed so that its rear end is slightly ahead of the vertical center line of the canted wheels 2.

A rotary planting mechanism is included in the machine between the wheels 2 and incorporates a plurality of circumferentially spaced radial arms 8, fitted at their outer ends with plant holding clamps 9; there being automatic means to open the clamps 9 at an elevated point for the reception of plants 10 therein, and to again open said clamps at a substantially dead-center bottom position to release the plants into the furrow 11 formed by the leading shoe 4. The wheels 2 serve as furrow closing means and close the furrow shortly after each plant is deposited therein.

The present invention is incorporated in the above planting machine and comprises the following arrangement:

A water discharge conduit 12 extends into the hollow, furrow opening shoe 4 at the top and adjacent its front end, and thence curves downwardly and rearwardly and forms the rear bottom portion of said shoe; the conduit thus becoming a unitary part of the shoe.

At its rear end the conduit 12 discharges rearwardly into the furrow 11 adjacent the bottom thereof, and the rear end portion of said conduit is cut away on top, as at 13, to assure of adequate water delivery from the shoe into the furrow.

At its upper end the conduit 12 connects with a spring closed poppet-type valve 14 which includes a depressible valve control stem 15. At the end opposite the conduit 12 the valve 14 is connected with a supply conduit 16 which leads to said valve from a water tank 17 on the machine.

The valve 14 is automatically opened by the following arrangement, upon deposit of each plant 10 in the furrow 11:

One of the wheels 2 is provided with a plurality of radially outwardly facing arcuate cams 18 circumferentially attached to the rim 3 of said wheel by a bracket 19 which includes a U-shaped clamp 20 straddling the rim and adjustably secured thereto by set screws 21. The number of cams 18 is equal to the number of clamps 9, and said cams are disposed on the corresponding wheel 2 in the same spaced relation as said clamps, but corresponding cams lead the clamps 9 some distance so that the cams operate the following valve opening mechanism at the proper time.

The valve opening mechanism which is shown in detail in Figs. 2 and 3 comprises a tubular sleeve 22 projecting laterally from the valve 14, and a control rod 23 turnably extends through said sleeve. At its inner end the rod 23 is fitted with a generally L-shaped finger 24 which engages the outer end of the depressible valve opening stem 15.

At its outer end beyond the sleeve 22 the rod 23 is fitted with a T-head 25 adjustably secured to said rod by a set screw 26; the T-head including, at right angles to the rod 23, a longitudinally adjustable shank 27. The sleeve 22 extends transversely of the machine above the shoe 4, and the shank 27 extends at a rearward and downward incline; there being a roller 28 mounted on said shank at its lower end.

The above described mechanism is disposed so that with rotation of the wheels 2, the cams 18 successively engage the roller 28, swinging the T-head 25 in a direction to rotate the rod 23, which moves the finger 24 in a valve opening direction. When this occurs water flows from the tank 17 through conduit 16 into the conduit 12, and thence discharges into the furrow 11.

The positioning of the cams 18 on the corresponding wheel 2 is such that the above valve opening operation occurs each time a clamp 9 releases a plant 10 into the furrow 11. As the water discharges from the conduit 12 it washes or flushes the roots of the adjacent plant into proper position in the furrow, and which occurs a moment in advance of closing of the furrow by the rims 3 of the presser wheels 2.

The amount of water which is deposited about the roots of each plant is controlled by the length of the cams 18, i. e. a relatively short cam would effect discharge of a small amount of water, while a relatively long cam would hold the valve open a substantially greater length of time, causing discharge of a greater volume of water.

The above described device provides a practical and efficient means of establishing initial moisture in the furrow about the plant roots.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A water feeding device for a planting machine including a furrow opening shoe and a planting mechanism operative to successively deposit plants in predetermined spaced relation in the furrow adjacent but to the rear of the shoe; said device comprising a water tank on the machine, a conduit leading from the tank to a point of discharge into the furrow adjacent plants deposited therein, a normally closed valve in the conduit, and means arranged to open said valve in timed relation to the deposit of plants in the furrow; the shoe being hollow and open at its rear end, and a discharge end portion of the conduit being disposed lengthwise in the bottom of the shoe adjacent said rear end thereof, the conduit discharging rearwardly from said open end of the shoe, said portion of the conduit being formed as a unitary bottom part of the shoe.

2. A water feeding device for a planting machine including a furrow opening shoe and a planting mechanism operative to successively deposit plants in predetermined spaced relation in the furrow adjacent but to the rear of the shoe; said device comprising a water tank on the machine, a conduit leading from the tank to a point of discharge into the furrow adjacent plants deposited therein, a normally closed valve in the conduit, and means arranged to open said valve in timed relation to the deposit of plants in the furrow; the shoe being hollow and open at its rear end, and a discharge end portion of the conduit being disposed lengthwise in the bottom of the shoe adjacent said rear end thereof, said portion of the conduit discharging rearwardly and being cut away on top for some distance forwardly of its rear end.

3. A water feeding device for a planting machine which includes a furrow opening shoe, a rotary planting mechanism having a plurality of circumferentially spaced plant holders thereon adapted to successively deposit plants in spaced relation in the furrow to the rear of the shoe, and a furrow closing presser wheel running on the ground to one side of the planting mechanism; said device comprising a water tank on the machine, a conduit leading from the tank to a point of discharge into the furrow adjacent plants deposited therein, a normally closed valve in the conduit, means to open said valve including a member movably mounted adjacent the presser wheel, and a plurality of cams corresponding in number to said plant holders, said cam being mounted on the presser wheel in position to successively engage and move said member and open the valve in predetermined timed relation to the deposit of plants in the furrow.

4. A water feeding device as in claim 9 including means mounting the cams on the wheel in circumferentially adjustable relation.

JEAN C. RENAULT.

REFERENCES CITED

The following references are of record in the file of this patent:

UNITED STATES PATENTS

| Number | Name | Date |
| --- | --- | --- |
| 603,744 | Scoville | May 10, 1898 |
| 912,816 | Creighton | Feb. 6, 1909 |
| 1,073,702 | Owens | Sept. 23, 1913 |
| 1,230,806 | Shaffer | June 19, 1917 |
| 1,368,486 | Chaney | Feb. 15, 1921 |
| 1,573,270 | Pearson | Feb. 16, 1926 |
| 1,637,980 | Arnold | Aug. 2, 1927 |
| 2,333,945 | Mast et al. | Nov. 9, 1943 |
| 2,372,739 | Renault | Apr. 3, 1945 |